(12) United States Patent
Borgerson et al.

(10) Patent No.: US 7,021,442 B2
(45) Date of Patent: Apr. 4, 2006

(54) ONE-WAY TORQUE TRANSMITTER WITH A FRICTION ACTUATING APPARATUS

(75) Inventors: James B. Borgerson, Ann Arbor, MI (US); Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 98 days.

(21) Appl. No.: 10/801,790

(22) Filed: Mar. 16, 2004

(65) Prior Publication Data

US 2005/0205377 A1   Sep. 22, 2005

(51) Int. Cl.
   *F16D 28/00* (2006.01)
   *F16D 67/06* (2006.01)

(52) U.S. Cl. .................. 192/84.7; 192/12 B; 192/84.6

(58) Field of Classification Search ............... 192/84.6, 192/84.7

See application file for complete search history.

(56) References Cited

U.S. PATENT DOCUMENTS

| | | | | |
|---|---|---|---|---|
| 5,651,437 A | * | 7/1997 | Organek et al. | 192/35 |
| 5,810,141 A | * | 9/1998 | Organek et al. | 192/35 |
| 5,910,061 A | * | 6/1999 | Organek et al. | 192/35 |
| RE36,502 E | * | 1/2000 | Organek et al. | 192/35 |
| 6,032,776 A | * | 3/2000 | Imao | 192/84.6 |
| 6,742,642 B1 | * | 6/2004 | Stevenson et al. | 192/84.6 |
| 6,874,609 B1 | * | 4/2005 | Bai | 192/84.6 |
| 6,948,396 B1 | * | 9/2005 | Stevenson | 74/335 |

* cited by examiner

*Primary Examiner*—Rodney H. Bonck
(74) *Attorney, Agent, or Firm*—Christopher DeVries

(57) ABSTRACT

A torque-to-thrust apparatus includes a one-way mechanism permitting free application of rotation to torque. A friction plate disposed between a portion of a one-way device and a stationary member of the torque-to-thrust apparatus inhibits reverse rotation at a predetermined torque level, which will maintain the thrust member of the torque-to-thrust apparatus in an engaged condition until a predetermined load is applied to the rotary side of the torque-to-thrust apparatus to overcome the friction load.

7 Claims, 3 Drawing Sheets

ONE-WAY TORQUE TRANSMITTER WITH A FRICTION ACTUATING APPARATUS

TECHNICAL FIELD

This invention relates to one-way torque-transmitting mechanisms for use with torque-to-thrust apparatus.

BACKGROUND OF THE INVENTION

One-way torque-transmitting mechanisms or Mechanical Diodes generally are sprag, roller, or strut type and are designed to prevent overrunning between two members in one direction of operation while permitting overrunning of a member in the opposite direction. These devices might either be torque-transmitting mechanisms of the rotating type or torque-transmitting mechanisms providing a stationary operation such as a brake. These one-way devices have found a lot of use in power transmission situations wherein it is desirable to establish at least one ratio such that on a ratio interchange, the one-way device will simply overrun permitting a change within the gearing of a power transmission.

More recently, it has been proposed that the friction devices of a power transmission be actuated by torque-to-thrust mechanisms. Types of torque-to-thrust torque-transmitting apparatus or mechanisms are shown in U.S. Ser. No. 10/303,245 filed Nov. 25, 2002 and now U.S. Pat. No. 6,874,609; U.S. Ser. No. 10/319,957 filed Dec. 16, 2002; U.S. Ser. No. 10/738,564 filed Dec. 17, 2003 and now U.S. Pat. No. 6,948,396 and U.S. Ser. No. 10/946,759 filed Sep. 22, 2004. Each of these patent applications is assigned to the assignee of the present In a torque-to-thrust apparatus in an automatic transmission application, an electric motor is generally employed to provide input rotation through a rotary member, which is operatively connected with a linear thrust member through a cam arrangement such that upon rotation of the electric motor the linear member will provide an apply force to a friction torque-transmitting mechanism such as a clutch or brake. In order to retain the clutch or brake engaged, the electric motor must remain energized or a significant friction must be built into the torque-to-thrust apparatus.

The present invention seeks to improve the torque-to-thrust apparatus by providing a mechanism for retaining the engagement of the torque-transmitting mechanism but with little friction on the apply stroke which determines the required motor size.

SUMMARY OF THE INVENTION

It is an object of this invention to provide an improved one-way torque-transmitting mechanism having an overrun condition in one direction of operation and a limited holding mechanism in the opposite direction.

In one aspect of the present invention, a friction mechanism is disposed between one race of the torque-transmitting mechanism and a stationary wall member.

In another aspect of the present invention, the one race of the one-way device is held stationary by the friction mechanism in response to a thrust force being applied to a torque to thrust mechanism.

In yet another aspect of the present invention, the one-way device provides a low resistance input in one direction of rotation and a high resistance to input in the opposite direction of rotation.

In yet still another aspect of the present invention, the torque-to-thrust apparatus includes a friction actuated one-way device to provide a limited value holding force to maintain the torque-to-thrust apparatus in an operable position.

DESCRIPTION OF EXEMPLARY EMBODIMENTS

Figure 1:
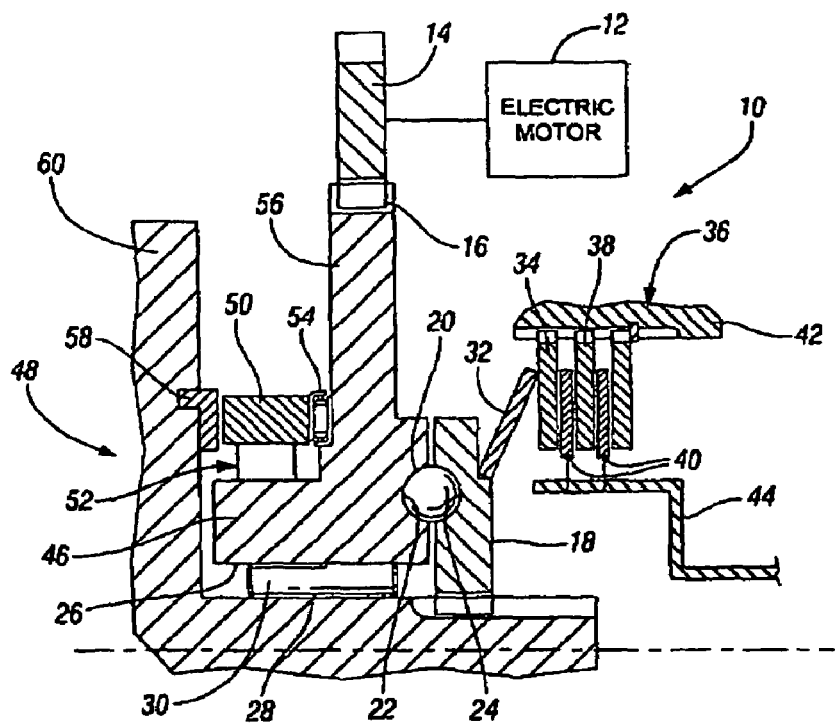
FIG. 1 is a cross-sectional elevational view of a portion of a torque-to-thrust apparatus incorporating the present invention.

Referring to the drawings, there is shown in FIG. 1 a torque-to-thrust apparatus generally designated 10. The torque-to-thrust apparatus 10 has an electric motor 12 driving an input gear 14, which meshes with an output gear 16.

A linearly moveable thrust plate 18 is operatively connected to the gear 16 by a cam mechanism 20, which includes a surface or track 22 formed on the output gear 16 and a surface or track 24 formed on the thrust plate 18. The output gear 16 has an inner diameter 26, which is rotatably mounted on a surface 28 through a bearing 30. The thrust plate 18 is disposed in abutment with a spring 32, which is contacting a friction plate 34, that is a member of a friction torque-transmitting mechanism 36.

The friction torque-transmitting mechanism 36 includes the friction plate 34 and friction plates 38, which are interdigitated with friction plates 40. The friction plates 34 and 38 are splined to a housing 42, and the friction plates 40 are splined to a housing 44. The friction plates 34, 38, and 40, as well as housings 42 and 44, form a conventional friction operated torque-transmitting mechanism. The torque-to-thrust apparatus 10 provides the apply force, which creates the frictional engagement between the plates 34, 38, and 40. These types of devices have been disclosed in prior patent applications.

The output gear 16 has a cylindrical portion 46, which forms an inner race for a one-way mechanism or Mechanical Diode 48. The one-way mechanism 48 has an outer race 50 and a plurality of roller, sprag, or strut members 52 disposed between the inner race 46 and the outer race 50.

A thrust bearing 54 is disposed between a radial face 56 of the output gear 16. The thrust bearing 54 is an antifriction bearing, which creates very little resistance to relative rotation between the face 56 and the outer race 50.

A friction plate 58 is disposed between the outer race 50 and a stationary wall 60. The friction plate 58 when abutted by the outer race 50 will restrain or inhibit rotation of the outer race 50. However, if the outer race 50 is restrained, as is well known with one-way mechanisms, the inner race 46 will be free to rotate in one direction while retarded in rotation in the other direction.

When the electric motor 12 provides forward rotation for the gears 14 and 16, the torque-transmitting mechanism 36 will be engaged by linear movement of the thrust plate 18. The thrust force at the plate 18 will be reacted through the gear 16 to the outer race 50 thereby enforcing engagement between the outer race 50 and the friction plate 58. Once the torque-transmitting mechanism 36 is fully engaged, the electric motor 12 can be de-energized.

In normal or conventional torque-to-thrust apparatus, the thrust imposed between the plate 18 and the gear 16 would cause reverse rotation of the gear 16 when the electric motor input force was discontinued. However, the one-way mechanism 48 through the operation of the outer race 50 and the friction plate 58 prevent reverse rotation of the gear 16 thereby retaining the torque-transmitting mechanism 36 engaged.

The frictional characteristics between the outer race 50 and the friction plate 58 are such that the electric motor 12 upon reverse rotation can overcome this friction force thereby driving the gear 16 in the opposite direction to permit disengagement of the torque-transmitting mechanism 36. As the gear 16 is driven in the reverse rotation, the thrust force of the interface of the tracks 22 and 24 reduces accordingly, thereby reducing the amount of energy required at the electric motor 12. This force transfer can be seen in FIG. 5.

Figure 5:
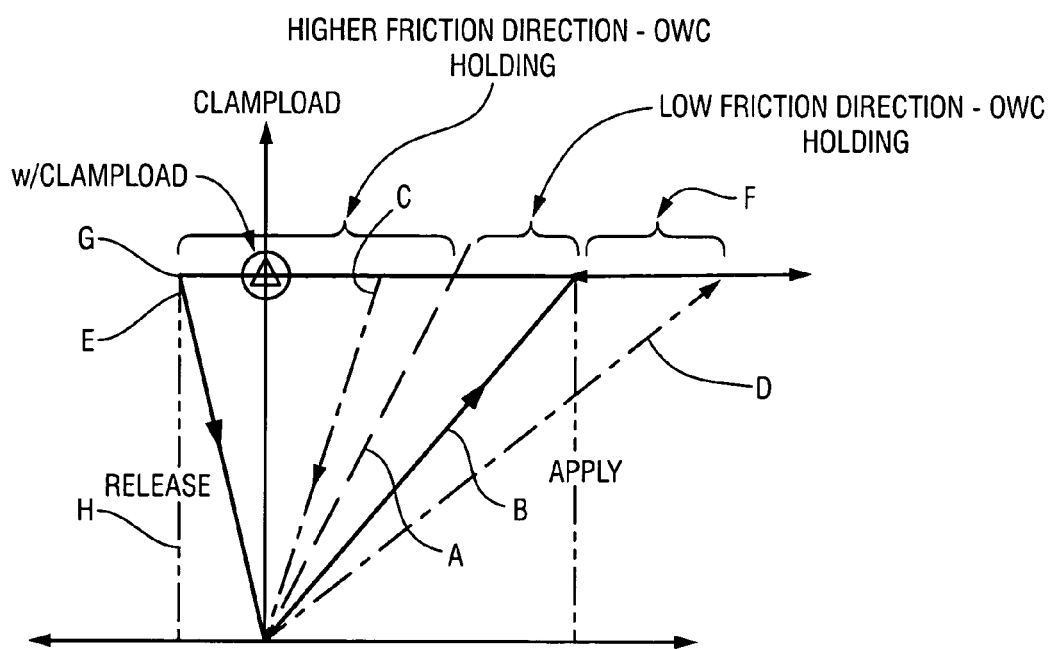
FIG. 5 is a series of curves relating motor torque to clamp load describing some of the operating characteristics of the present invention.

If one assumes a frictionless position in FIG. 5, the dashed line A would represent both the on-coming motor torque needed and the off-going motor torque needed to provide the clamping force or clamping load shown on the vertical axis. However, since systems are not frictionless, the on-coming motor torque must pass or traverse along the line B, which, of course, requires a greater motor torque than the ideal situation.

In order to release the clamp load, a motor torque along line C would be required in a conventional torque-to-thrust condition. Thus, the torque-to-thrust apparatus can disengage unless a force is maintained at the motor. While sufficient friction can be built into the system, it greatly increases the motor torque. The line D represents the motor torque required to provide sufficient friction such that the release load for the motor torque follows the line E. Thus, a considerable amount of energy represented by the distance F is required to provide the locking feature.

With the present invention, the on-coming motor torque increases along line B, which is required by the friction and the clamp load within the system, and having reached the desired clamp load and the friction mechanism comprised of the outer race 50 and the friction plate 58 is engaged by reversal of direction of rotation. When the friction mechanism is rotated to remove the clamp load, the motor 12 can be de-energized. The one-way mechanism 48 and the friction mechanism is released by energizing the motor 12, in the opposite direction, when it is desired to relieve the thrust load of the torque to thrust apparatus 10. This will require a motor torque to be increased to the point G prior to the release load being present at the torque-to-thrust apparatus 10. Thus, with the embodiment shown in FIG. 1, the torque-to-thrust apparatus is applied with the conventional motor torque and is released by a reversal of motor torque, which is great enough to overcome the friction plate 58. However, it should be evident that the motor 12 does not have to be energized to hold the torque to thrust apparatus 10 in the actuated condition.

Figure 2:
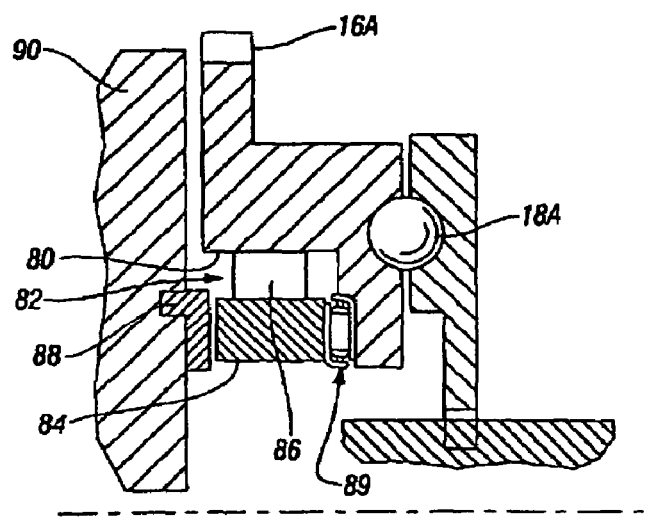
FIG. 2 is another embodiment showing a torque-to-thrust apparatus employing the present invention.

FIG. 2 describes an alternative embodiment wherein rotation of the gear member 16A is operable to provide a thrust force at thrust plate 18A in a manner similar to that described in FIG. 1. The gear 16A has a cylindrical surface 80, which forms the outer race of a one-way device or Mechanical Diode 82. The inner race of the one-way device 82 is a cylindrical component 84. The one-way device 82 has a plurality of rollers, sprags, or struts 86 disposed between the outer race 80 and the inner race 84. The inner race 84 is aligned axially to abut a friction plate 88, which is held stationary by a housing 90.

As described with the device in FIG. 1, the friction plate 88 does not increase the required load of the input to the gear 16A because the one-way device 82 is permitted to overrun, thereby bypassing the inner race 84 frictional engagement with the friction plate 88 via free rotation across thrust bearing 89. However, once a thrust force is applied to the plate 18A, the friction plate 88 is engaged such that at full engagement of an associated torque-transmitting mechanism, the friction force at the inner race 84 will maintain the gear 16A stationary until an input force from the electric motor is present to cause disengagement.

Figure 3:
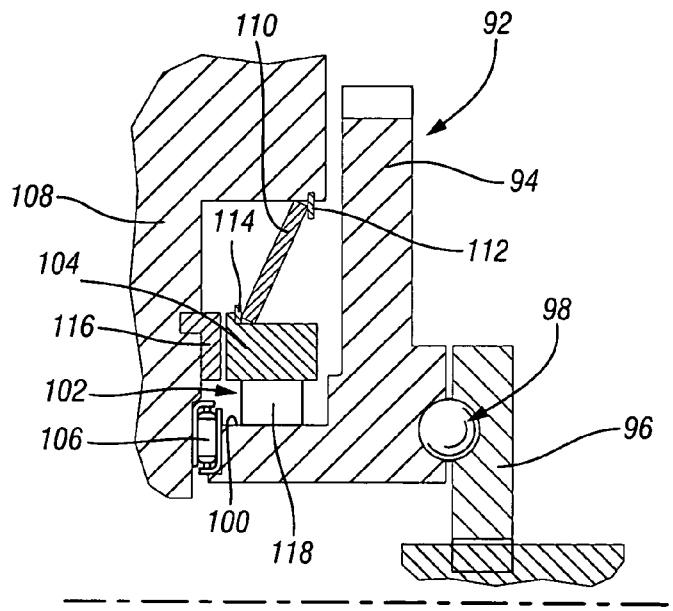
FIG. 3 is yet another embodiment describing the torque-to-thrust apparatus employing the present invention.

A torque-to-thrust in one-way mechanism 92 is shown in FIG. 3. A gear member 94 is operable in combination with a thrust plate 96 and a cam mechanism 98 to provide a thrust force to engage a conventional friction, operated torque-transmitting mechanism. The gear member 94 has a cylindrical surface 100 forming the inner race of a one-way torque-transmitting mechanism or Mechanical Diode 102. A cylindrical body 104 forms the outer race of the torque-transmitting mechanism 102. A thrust bearing 106 provides an antifriction member between the gear member 94 and a stationary housing 108.

A Bellville or washer type spring 110 is disposed between a locating ring 112 secured to the housing 108 and a locating ring 114 secured to the outer race 104. The spring 110 urges the outer race 104 leftward into engagement with a friction member or plate 116. The spring 110 therefore supplies the axial force required to engage the friction plate 116. This would provide a constant force at the friction interface between the outer race 104 and the friction plate 116.

The forward rotation of the gear 94 is uninhibited by this constant friction force since the thrust bearing 106 and one-way rollers, sprags, or struts 118 are essentially frictionless bearings in that direction of rotation. However, upon reverse rotation of the gear 94, sufficient energy must be put into the system such that the point G is achieved on the curve shown in FIG. 5. The required input load, however, would be constant along the line H in this situation, since the friction force is not related to the thrust force between the gear 94 and the thrust plate 96.

Figure 4:
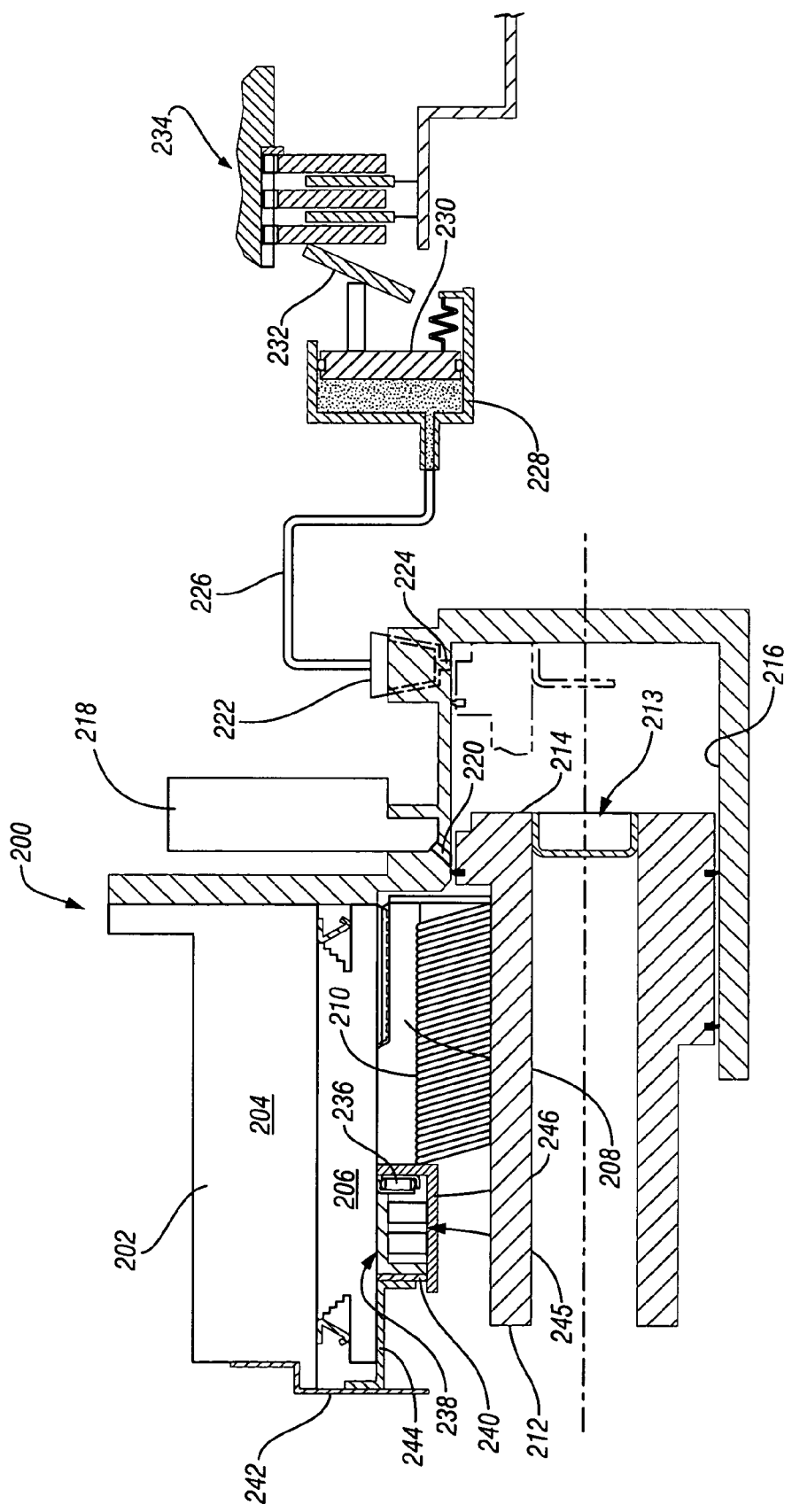
FIG. 4 is a further embodiment of the present invention wherein a torque-to-thrust apparatus employs the present invention and wherein the torque-to-thrust apparatus includes a hydraulic mechanism.

A torque-to-thrust apparatus 200 is shown in FIG. 4. This mechanism includes an electric motor 202 having a stator 204 and a rotor 206. The rotor 206 drives a sleeve shaft 208, which has formed thereon a roller screw 210. The roller screw 210 drives an output member 212 in a linear direction relative to the rotation of the rotor 206. The member 212 includes a master cylinder 213 having a piston 214 slidably disposed in a cylinder 216. The cylinder 216 is in fluid communication with a reservoir 218 through a passage 220 and with an output or outlet port 222 through a passage 224.

When the piston 214 is fully retracted, as shown in FIG. 4, the passage 220 is maintained open. When the piston 214 is driven rightwardly in the cylinder 216, the passage 220 is closed and fluid within the cylinder 216 is driven or pumped through the outlet port 222 to a passage 226, which is communicated with a chamber 228 disposed adjacent a slave cylinder 230. The slave cylinder 230 moves axially to engage an apply spring 232, which is a member of a conventional friction actuated torque-transmitting mechanism 234.

The pressure generated within the chamber 216 to provide engagement of the torque-transmitting mechanism 234 is reacted through a thrust bearing 236 and a sleeve 238 to a friction plate 240. The friction plate 240 is connected to a stationary wall 242 through a sleeve 244.

The sleeve 238 is rotatably supported through a one-way device or Mechanical Diode 245 to a housing 246, which is rotatable with the rotor 206. The one-way device 245 permits substantially uninhibited relative rotation between the sleeve 238 and housing 246 when the rotor 206 is rotated in a direction to cause pumping between the piston 214 and the cylinder 216. However, when the cylinder 216 is pressurized, the reaction load on the sleeve 208 is transmitted through the sleeve 238 to the friction plate 240 to cause engagement between the friction plate 240, sleeve 244, and the wall 242 thereby holding the outer race, represented by sleeve 238, of the one-way device 245 stationary and maintaining the piston 214 in the extended position. Rotation in the apply direction causes relative rotational movement to occur through the bearing 236 but rotation in the release direction drives through the one way clutch and causes the relative rotational movement to occur through the friction plate 240. In order to retract the piston 214, the torque at the motor 202 must be sufficient to overcome the friction represented by the friction plate 240. This is accomplished in a manner similar to that described for the above systems.

When the torque-transmitting mechanism 234 is fully engaged, of course, the electric motor 202 can be de-energized and the fluid pressure within the slave cylinder 230 is maintained by the torsional friction load at friction plate 240, which prevents reverse rotation of the motor 202 and thus prevents movement of the master cylinder 213 in the release direction.

The invention claimed is:

1. A torque-to-thrust apparatus including a one-way friction torque-transmitting mechanism comprising:
    a rotary input member operable in a forward and reverse direction;
    a linear output member;
    torque-to-thrust means disposed between said rotary input member and said linear output member for transmitting rotary motion of said input member to linear motion of said output member;
    a stationary component;
    a one-way torque-transmitting mechanism disposed adjacent said stationary component and being responsive to said rotary input member to permit free rotation in a first direction;
    a friction means disposed between said stationary component and a member of said one-way torque-transmitting mechanism to hold said one-way torque-transmitting mechanism member stationary to inhibit the reverse rotation of said rotary input member in a second direction until a predetermined rotary force is present at said rotary input member in said second direction.

2. The torque-to-thrust apparatus including a one-way friction torque-transmitting mechanism defined in claim 1 further comprising:
    said one-way torque-transmitting mechanism having an inner race and an outer race; and
    said friction means comprising a plate member disposed between said outer race and said stationary component.

3. The torque-to-thrust apparatus including a one-way friction torque-transmitting mechanism defined in claim 1 further comprising:
    said one-way torque-transmitting mechanism having an inner race and an outer race;
    said friction means comprising a plate member disposed between said inner race and said stationary component.

4. The torque-to-thrust apparatus including a one-way friction torque-transmitting mechanism defined in claim 1 further comprising:
    said friction means comprising a plate member secured to said stationary component adjacent said member of said one-way torque-transmitting mechanism.

5. The torque-to-thrust apparatus including a one-way friction torque-transmitting mechanism defined in claim 1 further comprising:
    said torque to thrust means comprising a hydraulic force generating means including a master cylinder and a slave cylinder.

6. The torque-to-thrust apparatus including a one-way friction torque-transmitting mechanism defined in claim 1 further comprising
    said friction means having a holding force proportional to a thrust force in said torque to thrust means.

7. The torque-to-thrust apparatus including a one-way friction torque-transmitting mechanism defined in claim 1 further comprising:
    said friction means having a substantially constant holding force.

* * * * *